(12) United States Patent
Togashi

(10) Patent No.: US 6,326,885 B1
(45) Date of Patent: Dec. 4, 2001

(54) KEYLESS SECURITY SYSTEM

(75) Inventor: Kazuyuki Togashi, Iwaki (JP)

(73) Assignee: Alpine Electronics, Inc. (JP)

(*) Notice: Subject to any disclaimer, the term of this patent is extended or adjusted under 35 U.S.C. 154(b) by 0 days.

(21) Appl. No.: 08/439,082

(22) Filed: May 11, 1995

(30) Foreign Application Priority Data

May 20, 1994 (JP) .................................................. 6-106848

(51) Int. Cl.$^7$ .................................................. B60R 25/10
(52) U.S. Cl. .......................... 340/426; 340/539; 340/531; 340/534; 340/825.69; 340/825.72; 307/10.2; 455/98
(58) Field of Search ..................... 340/426, 539, 340/825.69, 825.72, 531, 534; 307/10.2; 455/38.1, 38.2, 38.3, 99, 66

(56) References Cited

U.S. PATENT DOCUMENTS

| | | | |
|---|---|---|---|
| 5,049,867 | * | 9/1991 | Stouffer .................................. 340/426 |
| 5,193,210 | | 3/1993 | Nicholas et al. ...................... 455/38.1 |
| 5,278,547 | * | 1/1994 | Suman et al. ......................... 340/426 |

* cited by examiner

*Primary Examiner*—Julie Lieu
(74) *Attorney, Agent, or Firm*—Brinks Hofer Gilson & Lione

(57) ABSTRACT

A keyless security system which has eliminated the need for providing a vehicle-mounted receiver with an electric field detector, thereby achieving a simpler construction with resultant lower cost. The keyless security system is equipped with a portable transmitter for transmitting a remote control signal for locking and unlocking a vehicular door lock mechanism and a vehicle-mounted receiver which has a signal receiver for receiving the remote control signal, a signal processing unit for processing the remote control signal, and a control unit for monitoring each section of the vehicle and also for controlling the entire system. The control unit and the signal receiver are placed periodically in an activated condition and a standby condition. When the control unit detects the electric field of a received remote control signal, the control unit and the signal receiver are placed in a continuously activated condition. The remote control signal includes data information and idling information which precedes the data information and which is composed of bits of only 1 or 0. The idling information of the remote control signal received by the signal receiver is supplied to the control unit which then detects the electric field of the received remote control signal in accordance with the idling information.

19 Claims, 6 Drawing Sheets

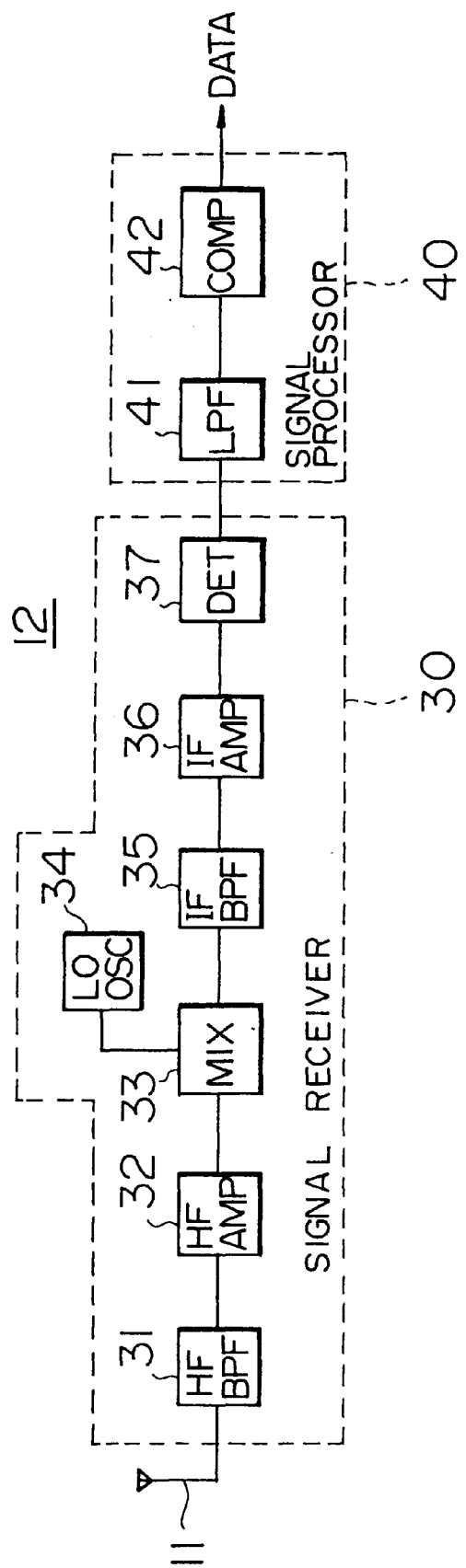

KEYLESS SECURITY SYSTEM

BACKGROUND OF THE INVENTION

1. Field of the Invention

The present invention relates to a keyless security system and, more particularly, to a keyless security system equipped with a portable transmitter and a vehicle-mounted receiver which receives a remote control signal supplied from the portable transmitter so as to lock or unlock a vehicular door lock mechanism and which also monitors each section of the vehicle when not in use and issues an alarm if any anomalies are detected.

2. Description of the Related Art

A conventional keyless security system is constructed by a portable transmitter and a vehicle-mounted receiver. When the vehicle is not in use, the vehicle-mounted receiver monitors for the motion of the vehicle, a shock applied to the vehicle, an opened door, a broken window, and other anomalies. The vehicle-mounted receiver serves as a vehicular security system for sounding an alarm if it detects such an anomaly and it also serves as a vehicular key to lock and unlock a vehicular door in response to the remote control signal received from the portable transmitter.

FIGS. 7A and 7B are schematic diagrams showing an outline of the construction of the aforesaid known keyless security system; FIG. 7A shows the construction of the portable transmitter and FIG. 7B shows the construction of the vehicle-mounted receiver.

The system illustrated in FIGS. 7A and 7B includes a portable transmitter 50, a button control panel 51, an unlock button (disarm button) 51-1, a lock button (arm button) 51-2, a remote control processing unit 52, a transmitting unit 53, a transmitting antenna 54, a vehicle-mounted receiver 60, a receiving antenna 61, a receiving module 62, a control unit 63, a power switch 64, a line voltage regulator 65, a door lock device 71, a door sensor 72, a motion sensor 73, a shock sensor 74, a glass sensor 75, a siren driver circuit 76, and a headlight blinker circuit 77.

The portable transmitter 50 includes the button control panel 51 which has the lock button 51-1 and the unlock button 51-2 for setting the lock/unlock condition of the vehicular door lock mechanism, the remote control processing unit 52 for issuing data signals corresponding to the aforesaid buttons 51-1 and 51-2, respectively, the transmitting unit 53 for converting the aforesaid data signals into remote control signals, and the transmitting antenna 54 for transmitting the remote control signals. The vehicle-mounted receiver 60 includes the receiving antenna 61 for receiving the remote control signals, a receiving module 62 which receives the remote control signals and supplies an electric field intensity detection signal SQ based on the remote control signals and the aforesaid data signal to the control unit 63, the control unit 63 which monitors each section of the vehicle and issues an alarm if any anomaly is detected, and also controls the locking and unlocking of the vehicular lock mechanism in response to the aforesaid data signal, the power switch 64 which turns ON/OFF the power to the receiving module 62, and the voltage regulator 65 which regulates the line voltage.

In connection with the construction stated above, the function for the vehicular security will be first described first. When the vehicle is not in use, if the vehicle-mounted receiver 60 is set in a security mode, then the control unit 63 is alternately switched in a fixed cycle between a control-activated condition, under which each section is monitored at high speed, and a standby condition, under which no monitoring control is carried out in the subsystem clock mode, so as to minimize the power consumed by the vehicle-mounted receiver 60. During the control-activated condition, the control unit 63 monitors for an opened door through the door sensor 72, vehicle motion through the motion sensor 73, a shock applied to the vehicle through the shock sensor 74, and a broken window through the glass sensor 75. If any of the anomalies is detected, the control unit 63 actuates the siren driver circuit 76 to give an audible alarm such as siren and/or actuates the headlight blinker circuit 77 to flash the headlight. The control unit 63 issues such an audible alarm to signal the anomaly of the vehicle; it issues no alarm if none of the aforesaid anomalies are detected.

The operation for locking and unlocking the vehicular door will now be described. Under the control-activated condition, the control unit 63 monitors for anomalies and also supplies control signal $V_{TCONT}$ to the power switch 64. While control signal $V_{TCONT}$ is being supplied, the power switch 64 functions to supply the line voltage obtained through the line voltage regulator 65 to the receiving module 62 so as to set the receiving module 62 ready for receiving the remote control signal. While the receiving module 62 is ready for receiving the remote control signal, if the lock button 51-1 or the unlock button 52-2 of the button control panel 51 of the portable transmitter 50 is operated, then the data signal, which corresponds to the button operation, is generated in the remote control processing unit 52. The data signal thus generated is converted into the remote control signal through the transmitting unit 53 before it is transmitted through the transmitting antenna 54. When the receiving module 62 of the vehicle-mounted receiver 60 receives the transmitted remote control signal through the receiving antenna 61, the receiving module 62, which is ready for receiving the remote control signal, processes the received remote control signal and supplies electric field detection signal SQ (representing electric field of the remote control signal and demodulated data signal DATA) to the control unit 63. Upon receipt of electric field detection signal SQ, the control unit 63 switches the periodic control-activated condition over to the continuous control-activated condition. At the same time, the control unit supplies continuous control signal $V_{TCONT}$ to the power switch 64 and it also sets the receiving module 62 for receiving continuous remote control signals. Thus, the receiving module 62 becomes ready to receive the remote control signals which are supplied in succession. The control unit 63 drives the door lock device 71 in accordance with the contents of data signal DATA supplied from the receiving module 62, thereby locking or unlocking the vehicular door key.

FIG. 8 is the block diagram showing the details of the configuration of the receiving module 62 in the known keyless security system illustrated in FIG. 7B.

The receiving module 62 shown in FIG. 8 includes a signal receiver 80, a high-frequency band-pass filter 81, a high-frequency amplifier 82, a frequency mixer circuit 83, a local oscillator 84, an intermediate-frequency (IF) band-pass filter 85, an IF amplifier 86, a demodulating unit 87, a signal processor 90, a low-pass filter 91, a comparator circuit 92, an electric field detector 95, a band-pass filter 96, an electric field intensity detector 97, and a comparator circuit 98. Other composing elements which are identical to those shown in FIG. 7B are assigned the same reference numerals.

The signal receiver 80 includes the high-frequency band-pass filter 81 for removing the frequency components to isolate the effective frequency component from a received remote control signal, the high-frequency amplifier 82 for amplifying the filtered remote control signal as necessary, the local oscillator 83 for generating a local oscillation frequency signal, the frequency mixer circuit 84 for mixing the remote control signal with the local oscillation frequency signal and for generating an IF signal, the IF band-pass filter 85 for removing unnecessary frequency components from the IF signal, the filtered IF amplifier 86 for amplifying the IF signal as necessary, and the demodulating unit 87 for demodulating the filtered IF signal to obtain a data signal. The signal processor 90 includes the low-pass filter for removing unnecessary frequency components to leave the data signal component, and the comparator circuit 92 for comparing the data signal with a predetermined level so as to obtain the required data signal DATA. The electric field detector 95 is comprised of the band-pass filter 96 for removing the required frequency component which contains the data signal component, the electric field intensity detector 97 for detecting the electric field intensity of the filtered data signal, and the comparator circuit 98 for comparing the detected electric field intensity with a predetermined level to obtain required field electric detection signal SQ.

In this case, the procedure for processing the remote control signal received by the signal receiver 80 (i.e., the steps of the procedure for generating the demodulation data signal from the received remote control signal) is the same as the procedure for the demodulation carried out by the AM receiver or the like (if the remote control signal is of an AM-modulated wave). Such a demodulating procedure is well known in the technical field; therefore, a description of the procedure for processing the remote control signal received by the signal receiver 80 will be omitted.

In the signal processor 90, the data signal generated by the signal receiver 80 first passes through the low-pass filter 91 so that the unwanted frequency components are removed to isolate the data signal component, then the filtered data through the comparator circuit 92 which compares the data signal component with the predetermined level to remove noise components before the data signal component is output as the required data signal DATA. In the electric field detector 95, the data signal produced by the signal receiver 80 first goes through the band-pass filter 96 to remove the required frequency component which contains the data signal component, then the resulting signal passes through the electric field detector 97 to detect the electric field intensity of the data signal. The detected electric field intensity is then with the predetermined level by the comparator circuit 98 before the data signal is output as the required electric field detection signal SQ.

The known keyless security system described above is designed to generate the electric field detection signal SQ by the electric field detector 95 of the vehicle-mounted receiver 60 and to supply the electric field detection signal SQ to the control unit 63, thereby placing the control unit 63 in the continuous control-activated mode and also setting the receiving module 62 for receiving continuous remote control signals. This requires that the vehicle-mounted receiver 60 be provided with the electric field detector 95, which serves solely as the detector of the electric field intensity of the remote control signal, resulting in a complicated structure and higher cost of the vehicle-mounted receiver 60.

SUMMARY OF THE INVENTION

Accordingly, the present invention has been made with a view toward solving the problem stated above and it is an object of the present invention to provide a keyless security system which allows the electric field detector to be eliminated from the vehicle-mounted receiver so as to achieve a simpler construction, thereby permitting lower cost.

To this end, according to the present invention, there is provided a keyless security system which is equipped with a portable transmitter for transmitting a remote control signal for locking and unlocking a door lock mechanism of a vehicle, and a vehicle-mounted receiver which has a signal receiver for receiving the aforesaid remote control signal, a signal processing unit for processing the received remote control signal, and a control unit for monitoring the condition of each section of the vehicle and for controlling the entire system, the aforesaid control unit and the aforesaid signal receiver, respectively, being placed periodically in the activated condition and the standby condition, and the aforesaid control unit and the aforesaid signal receiver being placed in a continuously activated condition when the control unit detects the electric field of the received remote control signal, wherein the remote control signal is composed of data information and idling information which precedes the data information and which comprises bits of only 1 or 0. The idling information of the remote control signal received by the aforesaid signal receiver is supplied to the control unit. The control unit is equipped with a first means for detecting the electric field of the remote control signal in accordance with the supplied idling information.

In the first means, the remote control signal is constructed by the data information and the idling information which precedes the data information and which is comprised of bits of only 1 or 0, and the vehicle-mounted receiver supplies the aforesaid idling information of the remote control signal, which has been received by the signal receiver, to the control unit, then the control unit detects the electric field of the remote control signal in accordance with the supplied idling information comprised of bits of only 1 or 0. This makes it possible to quickly detect the electric field of the received remote control signal without the need of providing the vehicle-mounted receiver with the electric field detector, thereby permitting a simplified structure with consequent reduced manufacturing cost of the vehicle-mounted receiver.

Further, to this end, according to the present invention, there is provided a keyless security system which is equipped with the portable transmitter for transmitting the remote control signal for locking and unlocking the door lock mechanism of a vehicle, and the vehicle-mounted receiver which has the signal receiver for receiving the aforesaid remote control signal, the signal processing unit for processing the received remote control signal, and the control unit for monitoring the condition of each section of the vehicle and for controlling the entire system, the aforesaid control unit and the aforesaid signal receiver, respectively, being placed periodically in the activated condition and the standby condition, and the control unit and the signal receiver being placed in a continuously activated condition when the control unit detects the electric field of the received remote control signal, wherein the remote control signal is composed of data information and idling information which precedes the data information and which is composed of Manchester-coded or SPL-coded bits composed only of 1 or 0, a low-pass filter having a cutoff frequency, which is sufficiently higher than the transmission frequency band for the idling information, is connected to the signal processing unit, the idling information of the remote control signal received by the signal receiver is supplied to the control unit via the low-pass filter of the signal processing unit, and the control unit is equipped with a second mean for detecting the electric field of the remote control signal in accordance with the idling information.

In the aforesaid second means, the remote control signal is composed of data information and idling information which precedes the data information and which is composed of Manchester-coded or SPL-coded bits composed only of 1 or 0, and in the vehicle-mounted receiver, the low-pass filter having the cutoff frequency, which is sufficiently higher than the transmission frequency band for the idling information, is connected to the signal processing unit, the idling information of the remote control signal received by the signal receiver is supplied to the control unit via the low-pass filter of the signal processing unit, and the control unit detects the electric field of the remote control signal in accordance with the idling information comprised of the supplied Manchester code or SPL code. This makes it possible to quickly detect the electric field of the received remote control signal without the need of providing the vehicle-mounted receiver with the electric field detector which is required in the known vehicle-mounted receiver, thus permitting the simplified structure with the consequent reduced manufacturing cost of the vehicle-mounted receiver.

BRIEF DESCRIPTION OF THE DRAWINGS

FIG. 2 is a block diagram which shows the details of the construction of an FM receiving module provided in a vehicle-mounted FM receiver of the first embodiment;

DESCRIPTION OF THE PREFERRED EMBODIMENTS

The details of the embodiments in accordance with the present invention will be described in conjunction with the accompanying drawings.

Figures 1A, 1B:
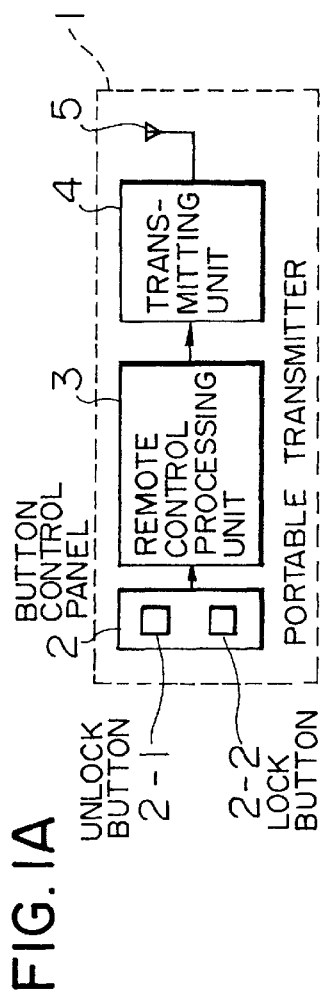
FIG. 1A and FIG. 1B are block diagrams which show a transmitter and receiver of a first embodiment of the keyless security system in accordance with the present invention.

FIG. 1 is the block diagram which shows the schematic structure of a first embodiment of the keyless security system in accordance with the present invention. FIG. 1A shows the portable transmitter and FIG. 1B shows the vehicle-mounted receiver, the vehicle-mounted FM receiver being used as an example.

The first embodiment of the keyless security system according to the present invention shown in FIGS. 1A and 1B includes a portable transmitter 1, a button control panel 2, a lock button (arm button) 2-1, an unlock button (disarm button) 2-2, a remote control processing unit 3, a transmitting unit 4, a transmitting antenna 5, a vehicle-mounted FM receiver 10, a receiving antenna 11, a receiving module 12, a control unit 13, a power switch 14, a line voltage regulator 15, a door lock device 21, a door sensor 22, a motion sensor 23, a shock sensor 24, a glass sensor 25, a siren driver circuit 26, and a headlight blinker circuit 27.

The portable transmitter 1 includes by the button control panel 2 having the lock button 2-1 and the unlock button 2-2, the remote control processing unit 3, the transmitting unit 4, and the transmitting antenna 5. The output of the button control panel 2 is connected to the input of the remote control processing unit 3; the output of the remote control processing unit 3 is connected to the input of the transmitting unit 4; and the output of the transmitting unit 4 is connected to the transmitting antenna 5. Likewise, the vehicle-mounted FM receiver 10 includes the receiving antenna 11, the receiving module 12, the control unit 13, the power switch 14, and the line voltage regulator 15. The input of the receiving module 12 is connected to the receiving antenna 11; and the output of the receiving module 12 is connected to the control unit 13. The power supply of the receiving module 12 is connected to the output of the line voltage regulator 15 via the power switch 14; and the input of the line voltage regulator 15 is connected to power terminal B+. The control unit 13 is connected to the power switch 14, the door lock device 21, the door sensor 22, the motion sensor 23, the shock sensor 24, the glass sensor 25, the siren driver circuit 26, and the headlight blinker circuit 27.

FIG. 2 is the block diagram which shows the details of the construction of the receiving module 12 provided in the vehicle-mounted FM receiver 10 of the first embodiment.

The receiving module 12 shown in FIG. 2 includes a signal receiver 30 which has a high-frequency band-pass filter 31, a high-frequency amplifier 32, a frequency mixer circuit 33, a local oscillator 34, an IF band-pass filter 35, an IF amplifier 36, and a demodulator 37. The receiving module 12 shown in FIG. 2 also includes a signal processing unit 40 which has a low-pass filter 41 and a comparator circuit 42. Other composing elements which are identical to those shown in FIG. 1B are given the same reference numerals.

The signal receiver 30 includes by the high-frequency band-pass filter 31, the high-frequency amplifier 32, the frequency mixer circuit 33, the local oscillator 34, the IF band-pass filter 35, the IF amplifier 36, and the demodulator 37. The input of the high-frequency band-pass filter 31 is connected to the receiving antenna 11; and the output thereof is connected to the output of the high-frequency amplifier 32. One input of the frequency mixer circuit 33 is connected to the output of the high-frequency amplifier 32; the other input is connected to the output of the local oscillator 34; and the output thereof is connected to the input of the IF band-pass filter 35. The output of the IF band-pass filter 35 is connected to the input of the IF amplifier 36, and the output of the IF amplifier 36 is connected to the input of the demodulator 37. The signal processing unit 40 is composed of the low-pass filter 41 and the comparator circuit 42. The input of the low-pass filter 41 is connected to the output of the demodulator 37 and the output thereof is connected to the input of the comparator circuit 42, the output of the comparator circuit 42 being connected to the control unit 13.

Figure 7:
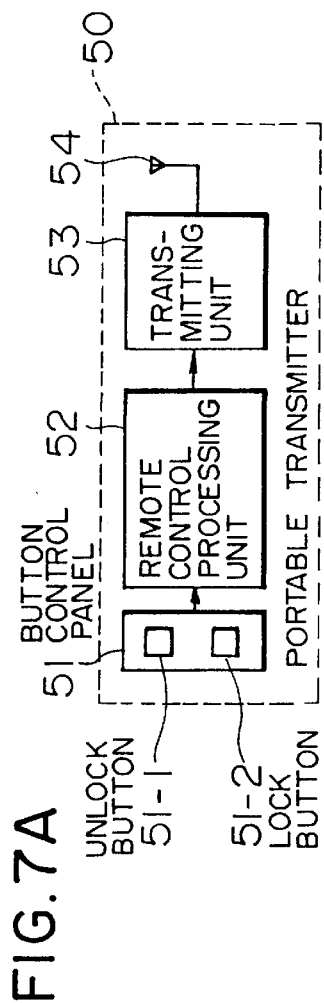
FIG. 7B and FIG. 7B are block diagrams which show the schematic structure of the construction of a known keyless security system.
Figure 8:
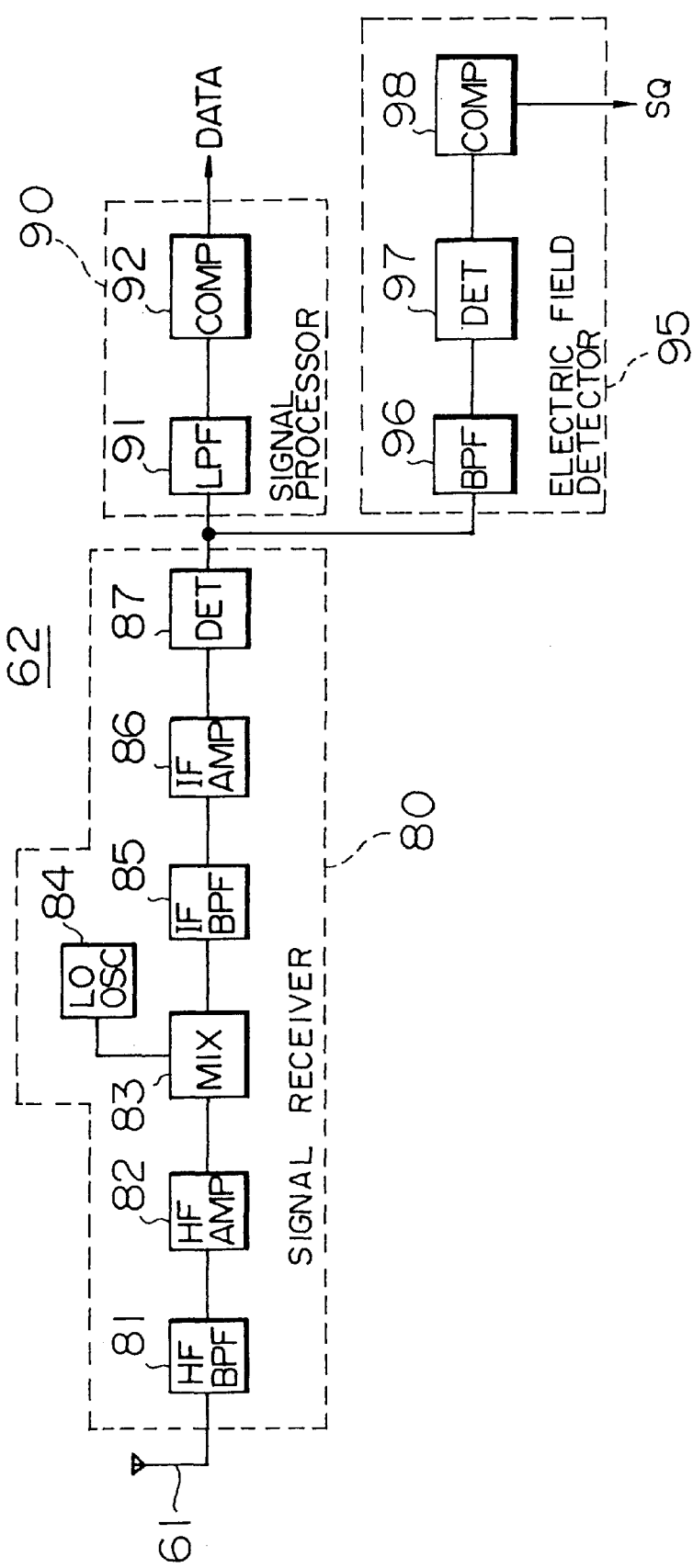
FIG. 8 is a block diagram which shows the details of the construction of the vehicle-mounted FM receiver in the known keyless security system shown in FIGS. 7A and 7B.

The keyless security system of the first embodiment shares the same construction as that of the known keyless security system shown in FIG. 7A and FIG. 7B except for the following two aspects. One aspect is connected with the constructions of the receiving modules 12 and 62, respectively, provided in the vehicle-mounted receivers 10 and 60: the known keyless security system is equipped with the electric field detector 95 in contrast to the keyless security system according to the first embodiment which does not have such an electric field detector. The other aspect is that the known keyless security system supplies electric field detection signal SQ obtained through the electric field detector 95 to the control unit 63 in contrast to the keyless security system according to the first embodiment which does not supply electric field detection signal SQ to the control unit 13.

Figure 3A:
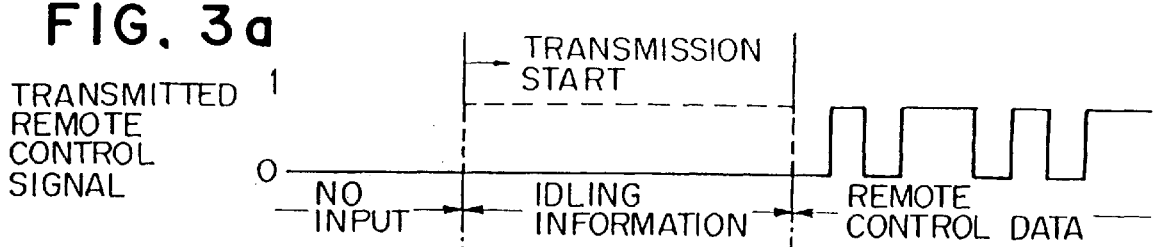
FIGS. 3(a), 3(b) and 3(c) are diagrams illustrative of the signal waveforms showing an example of the FM remote control signal used in the first embodiment.
Figure 3B:
Figure 3C:
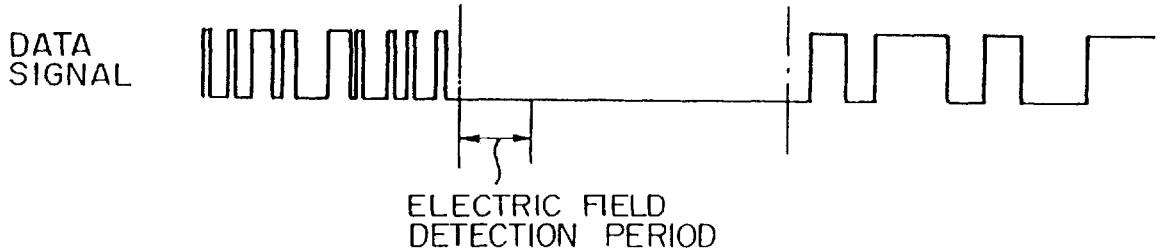

FIG. 3 is the diagram illustrative of the signal waveforms showing an example of the FM remote control signal used in the first embodiment. FIG. 3(a) shows the waveform of the FM remote control signal which is transmitted from the portable transmitter 1; FIG. 3(b) shows the waveform of the demodulated signal received from the signal receiver 30; and FIG. 3(c) shows the waveform of the data signal issued by the signal processing unit 40.

As shown in FIG. 3(a), the FM remote control signal transmitted by the portable transmitter 1 is constituted by remote control data information and idling information which precedes the data information and which is comprised of bits of only 1 or 0. Likewise, as shown in FIG. 3(b), the demodulated signal issued from the signal receiver 30 contains a noise component, which is superimposed during a non-signal period, in addition to the idling information and the data information. Further, as shown in FIG. 3(c), the data signal issued by the signal processing unit 40 is composed of a noise component, which has undergone waveform shaping, the idling information, and the data information.

The operation of the keyless security system according to the embodiment will now be described with reference to FIG. 1, FIG. 2, and FIGS. 3(a) through (c).

It should be noted that the keyless security system according to the embodiment performs exactly the same operation for the security of a vehicle as that of the known keyless security system. More specifically, when the vehicle is not in use, if the vehicle-mounted FM receiver 10 is set in the security mode, then the control unit 13 is alternately switched at a fixed cycle between the control-activated condition, under which each section is monitored at high speed, and a standby condition, under which no monitoring control is carried out in the subsystem clock mode, so as to minimize the power consumed by the vehicle-mounted FM receiver 10 to a minimum. During the control-activated condition, the control unit 13 monitors for an opened door through the door sensor 22, the vehicle motion through the motion sensor 23, a shock applied to the vehicle detected through the shock sensor 24, and a broken window through the glass sensor 25. If any of the anomalies are detected, the control unit 13 actuates the siren driver circuit 26 to give an audible alarm such as siren and/or actuates the headlight blinker circuit 27 to flash the headlights. The control unit 13 issues such an audible alarm to signal the anomaly of the vehicle; it issues no alarm if none of the aforesaid anomalies are detected.

The operation of the keyless security system according to the first embodiment for locking and unlocking the vehicular door lock mechanism is partly identical to and partly different from that of the known keyless security system. To be more specific, under the control-activated condition, the control unit 13 controls and monitors each section and it also supplies control signal $V_{TCONT}$ to the power switch 14. While control signal $V_{TCONT}$ is being supplied, the power switch 14 functions to supply the line voltage obtained through the line voltage regulator 15 to the receiving module 12 so as to set the receiving module 12 ready for receiving the FM remote control signal. While the receiving module 12 is being ready for receiving the FM remote control signal, if the lock button 2-1 or the unlock button 2-2 of the button control panel 2 of the portable transmitter 1 is operated, then the data information, which corresponds to the button operation, is generated in the remote control processing unit 3. The data information thus generated is converted into the FM remote control signal as shown in FIG. 3(a) through the transmitting unit 4 before it is transmitted through the transmitting antenna 5 to the vehicle. When the receiving module 12 of the vehicle-mounted receiver 10, which is ready for receiving the remote control signal, receives the transmitted FM remote control signal through the receiving antenna 11, the signal receiver 30 subjects the FM remote control signal to the high-frequency amplification, the frequency conversion, the IF amplification, and demodulation, in that order, so as to generate the demodulated signal shown in FIG. 3(b), just like in the FM signal processing carried out by the signal receiver 80 in the known receiving module 62. Then, the signal processing unit 40 shapes the waveform of the demodulated signal so as to generate data signal DATA shown in FIG. 3(c) in the same manner as the signal processing implemented by the signal processing unit 90 in the known receiving module 62 stated above, and data signal DATA is supplied to the control unit 13. At this time, the control unit 13 quickly detects the idling information comprised of bits of only 0 or only 1 contained in the received data signal DATA, then switches from the periodical control-activated condition to the continuous control-activated condition and it also supplies the continuous control signal $V_{TCONT}$ to the power switch 14 and sets the receiving module 12 for receiving the continuous FM remote control signal. Thus, the receiving module 12 becomes capable of receiving the data information supplied following the idling information which is transmitted as the FM remote control signal from the portable transmitter 1. Hence, the data information is supplied in succession to the control unit 13 via the signal receiver 30 and the signal processing unit 40. The control unit 13, therefore, drives the door lock device 21 to lock or unlock the vehicle door key.

Thus, according to the first embodiment, the control unit 13 quickly detects the idling information comprised of bits of only 1 or 0 from the supplied data signal DATA and it immediately switches to the continuous control-activated condition upon the detection of the idling information. The continuous control-activated signal $V_{TCONT}$ generated enables the receiving module 12 to receive the continuous FM remote control signals. This eliminates the need for providing the receiving module 12 with the electric field detection signal SQ which is required in the known keyless security system, thus achieving a simpler construction with the resultant lower cost.

Figure 4:
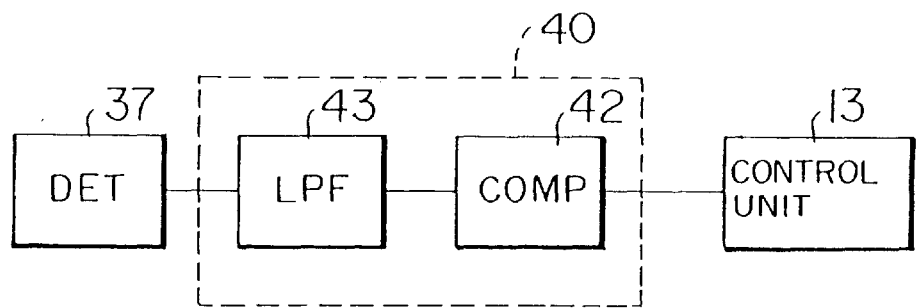
FIG. 4 is a block diagram showing the essential part of a second embodiment of the keyless security system in accordance with the present invention.

FIG. 4 is the block diagram showing the essential part of the second embodiment of the keyless security system in accordance with the present invention. The block diagram illustrates only the construction of the signal processing unit 40 and the connection between the signal processing unit 40 and the control unit 13 in the receiving module 12.

In FIG. 4, reference numeral 43 denotes the low-pass filter 43. Other composing elements which are identical to those shown in FIG. 1 and FIG. 2 are given the same reference numerals.

The signal processing unit 40 includes the low-pass filter 43 having the cutoff frequency, which is sufficiently higher than the transmission frequency band of the idling information, and a circuit which is cascade-connected with the comparator circuit 42. The input of the low-pass filter 43 is connected to the output of the signal receiving unit 30 and the output of the comparator circuit 42 is connected to the control unit 13.

Figure 5A:
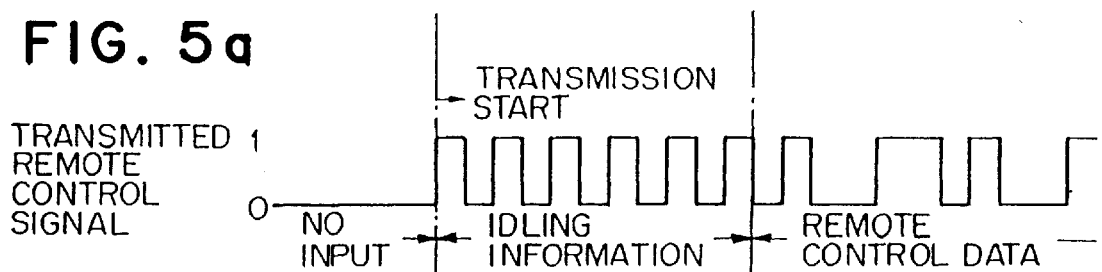
FIGS. 5(a), 5(b) and 5(c) are diagrams illustrative of the signal waveforms showing an example of the FM remote control signal used in the second embodiment.
Figure 5B:
Figure 5C:
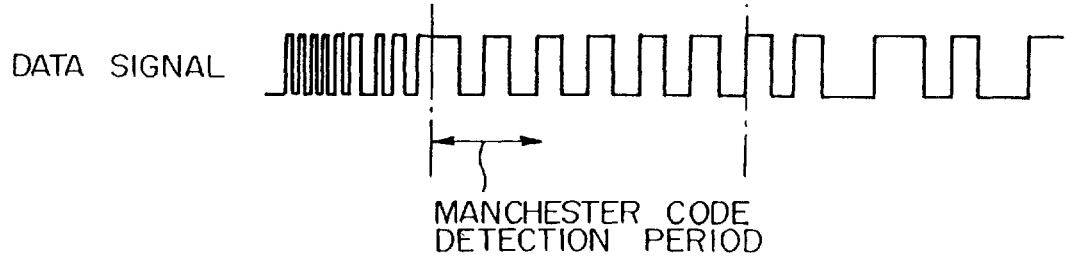

FIGS. 5(a), 5(b) and 5(c) are diagrams illustrative of the signal waveforms showing the example of the FM remote control signal used in the second embodiment. FIG. 5(a) shows the waveform of the FM remote control signal which is transmitted from the portable transmitter 1; FIG. 5(b) shows the waveform of the demodulated signal received from the signal receiver 30; and FIG. 5(c) shows the waveform of the data signal issued by the signal processing unit 40.

As shown in FIG. 5(a), the FM remote control signal transmitted by the portable transmitter 1 is constituted by remote control data information and idling information which precedes the remote control data information and which is comprised of Manchester-coded or SPL-coded bits of only 1 or 0. Likewise, as shown in FIG. 5(b), the demodulated signal issued from the signal receiver 30 contains a noise component, which is superimposed during a non-signal period, in addition to the idling information and the data information. Further, as shown in FIG. 5(c), the data signal issued by the signal processing unit 40 is composed of a noise component, which has undergone waveform shaping, the idling information, and the data information.

The construction of the second embodiment differs from that of the first embodiment only in that the bits in the first embodiment are composed only of 1 or 0 (high or low signal) while the bits in the second embodiment are the Manchester-coded or SPL-coded bits composed only of 1 or 0 (short or long pulses) and also in that the cutoff frequency of the low-pass filter 41 of the first embodiment is different from the low-pass filter 43 of the second embodiment because of the difference in the composition of the idling information. The rest of the construction of the second embodiment is the same as that of the first embodiment; therefore, no further description will be given to the structure of the second embodiment.

The operation of the second embodiment is also substantially identical to the operation of the first embodiment; therefore, the detailed explanation of the operation of the second embodiment will be omitted. In the second embodiment, however, when the demodulated signal received from the signal receiver 30 is processed by the low-pass filter 43 of the signal processing unit 40, the cutoff frequency of the low-pass filter 43 is selected to be sufficiently higher than the transmission frequency band for the idling information so that the output noise component during the no-input period is approximately double the aforesaid transmission frequency band. Hence, when the data signal from the signal processing unit 40 is applied to the control unit 13, the control unit 13 can detect the idling information, i.e. the electric field of the received FM remote control signal, simply by detecting one Manchester-coded or SPL-coded bit in the idling information.

Thus, the second embodiment provides an advantage in that the electric field of the received FM remote control signal (idling information) can be detected very quickly in addition to the same advantage as that of the first embodiment stated above.

Figure 6:
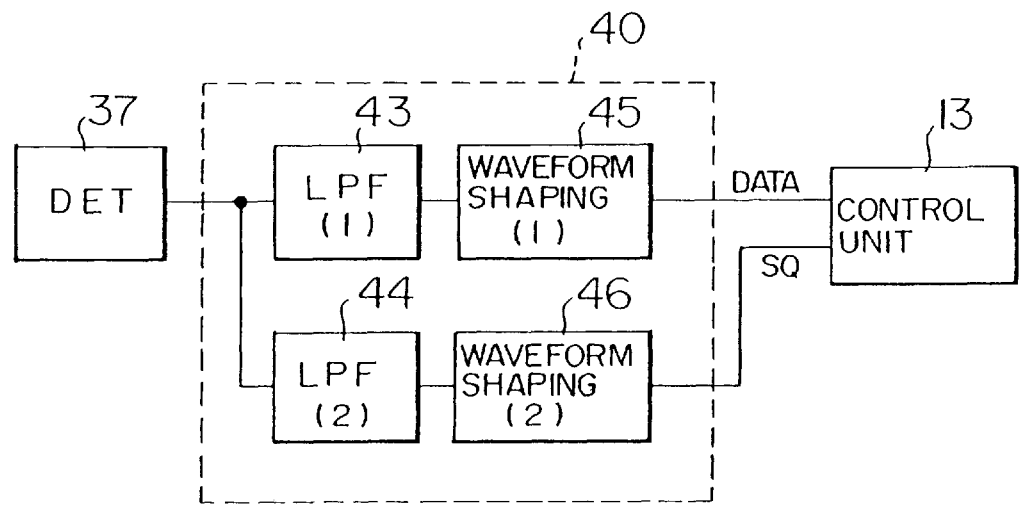
FIG. 6 is a block diagram showing the essential part of a third embodiment of the keyless security system in accordance with the present invention.

FIG. 6 is the block diagram showing the essential section of a third embodiment of the keyless security system in accordance with the present invention. The figure shows only the construction of the signal processing unit 40 and the connection between the signal processing unit 40 and the control unit 13 in the receiving module 12.

In FIG. 6, reference numeral 44 denotes a second low-pass filter, reference numeral 45 denotes a first waveform shaping circuit, and reference numeral 46 indicates a second waveform shaping circuit. The remaining composing elements which are identical to those shown in FIG. 1, FIG. 2, and FIG. 4 are given the same reference numerals.

The signal processing unit 40 includes a first cascade-connected circuit composed of the low-pass filter 43 having a cutoff frequency, which is sufficiently higher than the transmission frequency band of the idling information, and the first waveform shaping circuit 45, and a second cascade-connected circuit composed of the second low-pass filter 44 having a cutoff frequency, which is slightly higher than the transmission frequency band of the idling information, and the second waveform shaping circuit 46, the two cascade-connected circuits being connected in parallel. The inputs of the low-pass filter 43 and the second low-pass filter 44 are connected to the output of the signal receiving unit 30. The outputs of the first waveform shaping circuit 45 and the second waveform shaping circuit 46 are connected to the control unit 13.

The construction of the third embodiment is different from that of the second embodiment in that the signal processing unit 40 of the second embodiment includes the cascade-connected circuit of the low-pass filter 43 and the comparator circuit 42 while the signal processing unit 40 of the third embodiment is composed of the first cascade-connected circuit, which includes the low-pass filter 43 and the first waveform shaping circuit 45, and the second cascade-connected circuit which includes the second low-pass filter 44 and the second waveform shaping circuit 46, the two cascade-connected circuits being connected in parallel. There is no other structural difference between the third embodiment and the second embodiment; therefore, no further description will be given to the construction of the third embodiment.

The operation of the third embodiment is also substantially identical to the operation of the second embodiment; therefore, the detailed explanation on the operation of the third embodiment will be omitted.

In the case of the second embodiment, when the data signal is processed by the signal processing unit 40, i.e. when the data signal is processed through the cascade-connected circuit composed of the low-pass filter 43 and the comparator circuit 42, the sensitivity for detecting the electric field of the received FM remote control signal (i.e. the idling information) is about 1 to 2 dB lower than the sensitivity obtained by direct detection of the idling information since the cutoff frequency of the low-pass filter 43 is selected so that it is sufficiently higher than the transmission frequency band of the idling information. To avoid this reduction in the detecting sensitivity, in the third embodiment, the signal processing unit 40 is constructed by the first cascade-connected circuit, which includes the low-pass filter 43 and the first waveform shaping circuit 45, and the second cascade-connected circuit which includes the second low-pass filter 44 and the second waveform shaping circuit 46. The first cascade-connected circuit is used for taking out the data information while the second cascade-connected circuit is used for taking out the idling information so as to prevent the deterioration in the sensitivity for detecting the electric field of the received FM remote control signal, i.e. for detecting the idling information.

Thus, the third embodiment provides an advantage in that the electric field of the FM remote control signal, i.e. the idling information, can be detected with a relatively high sensitivity in addition to the same advantage provided by the first embodiment stated above.

In the embodiments described above, the vehicle-mounted FM receiver 10 was employed as an example of the vehicle-mounted receiver; however, the vehicle-mounted receiver in accordance with the present invention is not limited to the application where the vehicle-mounted FM receiver is dedicated to FM signals. The vehicle-mounted receiver may alternatively be a vehicle-mounted receiver capable of receiving FM signals and AM signals or it may be a vehicle-mounted receiver dedicated to AM signals as necessary. Likewise, the modulation mode of the remote control signals may be AM instead of FM according to the type of the vehicle-mounted receiver employed.

As stated above, according to one aspect of the present invention, the remote control signal is constructed by the data information and the idling information which precedes the data information and which is composed of bits of only 1 or 0; in the vehicle-mounted receiver 10, the idling information of the remote control signal received by the signal receiver 30 is supplied to the control unit 13 which detects the electric field of the remote control signal in accordance with the idling information. Hence, there is no need to provide the vehicle-mounted receiver 10 with the electric field detector as in the case of the known vehicle-mounted receiver. Moreover, the electric field of the received remote control signal can be quickly detected. These features permit the simpler construction of the vehicle-mounted receiver 10 and consequently achieve reduced manufacturing cost.

Further, according to another aspect of the present invention, the remote control signal is constituted by the data information and the idling information which precedes the data information and which is composed of Manchester-coded or SPL-coded bits of only 1 or 0. In the vehicle-mounted receiver 10, the low-pass filter 43 having the cutoff frequency, which is sufficiently higher than the transmission frequency band of the idling information, is connected to the signal processing unit 40; and the idling information of the remote control signal received by the signal receiver 30 is supplied to the control unit 13 via the low-pass filter 43. The control unit 13 detects the electric field of the remote control signal in accordance with the supplied idling information. This arrangement enables the detection of the electric field of the received remote control signal without the need for providing the vehicle-mounted receiver 10 with the electric field detector which is required in the known vehicle-mounted receiver, thus making it possible to achieve a simpler construction of the vehicle-mounted receiver 10 with the consequent reduced manufacturing cost, and also to quickly detect the electric field, leading to a shorter rise time of the control unit 13.

What is claimed is:

1. A keyless security system for a vehicle, the keyless security system comprising:
   a portable transmitter for transmitting a predetermined remote control signal which contains idling information, wherein said idling information is composed of a plurality of digital bits comprising only one of logical one and logical zero information; and
   a signal receiver for receiving said remote control signal, said signal receiver including:
      a signal processing unit for processing said received remote control signal; and
      a control unit for controlling a receptive state of said signal receiver in response to the processed remote control signal, and for monitoring the active condition of at least one sensor mounted on said vehicle;
      wherein said control unit detects a transmission of said remote control signal from said portable transmitter by identifying the idling information supplied from said signal processing unit.

2. A keyless security system according to claim 1, wherein the remote control signal from said portable transmitter is composed of at least data information and said idling information, and wherein the idling information precedes the data information.

3. A keyless security system according to claim 1, wherein said signal receiver further comprises means for receiving at least an FM remote control signal.

4. A keyless security system according to claim 1, wherein said control unit is connected to receive activation signals from a plurality of sensors including a door sensor for detecting an opened door, a motion sensor for detecting the motion of the vehicle, a shock sensor for detecting a shock applied to the vehicle, and a glass sensor for detecting a broken window, and wherein the control unit issues an audible alarm when at least one activation signal is received, indicating that at least one of said sensors has been activated.

5. A keyless security system comprising:
   a portable transmitter for transmitting a predetermined remote control signal which contains idling information and data information, wherein the idling information precedes the data information; and
   a vehicle-mounted receiver including:
      a signal receiver for receiving said remote control signal;
      a signal processing unit for processing the received remote control signal; and
      a control unit for controlling a receptive state of said signal receiver in response to the processed remote control signal, and for monitoring the condition of at least one sensor mounted on the vehicle;
      wherein said control unit and said signal receiver are placed periodically in either of an activated condition and a standby condition, and said control unit and said signal receiver are placed in a continuously activated condition when said control unit detects the idling information of the received remote control signal; and
      wherein said idling information contained in the remote control signal received by said signal receiver is supplied to said control unit and said control unit detects a transmission of said remote control signal from the remote control unit by identifying the supplied idling information.

6. The keyless security system according to claim 5, wherein said idling information is composed of digital bits comprising only one of logical one and logical zero information.

7. The keyless security system according to claim 5, wherein said signal receiver further comprises means for receiving at least an FM remote control signal.

8. A keyless security system according to claim 5, wherein said control unit is connected to receive activation signals from a plurality of sensors including a door sensor for detecting an opened door, a motion sensor for detecting the motion of the vehicle, a shock sensor for detecting a shock applied to the vehicle, and a glass sensor for detecting a broken window and the control unit issues an audible alarm when at least one activation signal is received, indicating that at least one of said sensors has been activated.

9. A keyless security system comprising:
   a portable transmitter for transmitting a predetermined remote control signal which contains idling information; and the vehicle-mounted receiver including:
- a signal receiver for receiving said remote control signal;
- a signal processing unit for processing the received remote control signal; and
- a control unit for controlling a receptive state of said signal receiver in response to the processed remote control signal, and for monitoring the condition of at least one sensor mounted on the vehicle;
- wherein said control unit and said signal receiver are placed periodically in either of an activated condition and a standby condition, and said control unit and said signal receiver are continuously placed in the activated condition when said control unit detects a transmission of the received remote control signal;
- wherein said signal processing unit includes a low-pass filter, the idling information of the remote control signal received by said signal receiver being supplied to said control unit via the low-pass filter of said signal processing unit, and said control unit detects a transmission of said remote control signal by identifying said idling information;
- wherein the signal processing unit does not include an electric field detector.

10. A keyless security system according to claim 9, wherein said remote control signal from said portable transmitter is composed of at least data information and the idling information, and wherein the idling information precedes the data information.

11. The keyless security system according to claim 10, wherein said idling information is composed of Manchester-coded or SPL-coded bits comprising only one of logical one and logical zero information.

12. The keyless security system according to claim 9, wherein said low-pass filter in said signal processing unit has a cutoff frequency which is substantially higher than the transmission frequency band of said idling information.

13. The keyless security system according to claim 12, wherein said signal processing unit further includes a second low-pass filter having a second cutoff frequency which is slightly higher than the transmission frequency band of said idling information, said second low-pass filter being connected in parallel to the first low-pass filter having the cutoff frequency which is substantially higher than the transmission frequency band of said idling information.

14. The keyless security system according to claim 12, wherein said first and second low-pass filters have outputs thereof connected to waveform shaping circuits, thus forming a first cascade-connected circuit and a second cascade-connected circuit, respectively.

15. The keyless security system according to claim 14, wherein said first cascade-connected circuit isolates the data information and said second cascade-connected circuit isolates the idling information.

16. The keyless security system according to claim 9, wherein said signal receiver further comprises means for receiving at least the FM remote control signal.

17. The keyless security system according to claim 9, wherein said control unit detects a single Manchester-coded or SPL-coded bit in the idling information in order to identify said idling information.

18. A keyless security system according to claim 9, wherein said control unit is connected to receive activation signals from a plurality of sensors including the door sensor for detecting an opened door, the motion sensor for detecting the motion of the vehicle, the shock sensor for detecting a shock applied to the vehicle, and the glass sensor for detecting broken window and the control unit issues an audible alarm when at least one activation signal is received, indicating that at least one of said sensors has been activated.

19. A keyless security system for a vehicle, the keyless security system comprising:
- a portable transmitter for transmitting a predetermined remote control signal which contains idling information and data information, wherein the idling information precedes the data information; and
- a signal receiver for receiving said remote control signal, said signal receiver including:
  - a signal processing unit for receiving transmission signals and for generating a reception signal in response to the transmission signals;
  - a switch connected between a power supply and the signal processing unit; and
  - a control unit connected to the signal processing unit and to the switch, said control unit generating a control signal for controlling said switch to connect the power supply to the signal processing unit;
  - wherein said signal processing unit transmits a reception signal to said control unit only while the signal processing unit is connected to the power supply through the switch;
  - wherein said control unit periodically generates said control signal such that the signal processing unit generates a plurality of reception signals; and
  - wherein, in response to the presence of said idling information in one of the successive plurality of reception signals, said control unit continuously generates said control signal such that the data information of the received remote control signal is transmitted from the signal processing unit to the control unit.

* * * * *